(12) United States Patent (10) Patent No.: US 7,681,143 B2
Lindsay et al. (45) Date of Patent: Mar. 16, 2010

(54) SYSTEM AND METHOD FOR PROVIDING A WINDOW MANAGEMENT MODE

(75) Inventors: Donald J Lindsay, Mountain View, CA (US); Mark R Ligameri, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 217 days.

(21) Appl. No.: 11/279,425

(22) Filed: Apr. 12, 2006

(65) Prior Publication Data

US 2006/0248404 A1 Nov. 2, 2006

Related U.S. Application Data

(62) Division of application No. 11/117,717, filed on Apr. 29, 2005, now abandoned.

(51) Int. Cl.
*G06F 3/048* (2006.01)
(52) U.S. Cl. .................. 715/788; 715/838; 715/779; 715/802
(58) Field of Classification Search ............. 715/790, 715/794, 797, 799, 800, 802, 781, 838, 788, 715/783, 779, 810
See application file for complete search history.

(56) References Cited

U.S. PATENT DOCUMENTS

| | | | |
|---|---|---|---|
| 4,890,257 A | 12/1989 | Anthias et al. | |
| 5,412,776 A | 5/1995 | Bloomfield | |
| 5,499,334 A | 3/1996 | Staab | |
| 5,657,463 A | 8/1997 | Bingham | |
| 5,668,962 A | 9/1997 | Kitami | |
| 5,712,995 A | 1/1998 | Cohn | |
| 5,757,371 A | 5/1998 | Oran et al. | |
| 5,889,517 A | 3/1999 | Ueda et al. | |
| 6,018,340 A | 1/2000 | Butler et al. | |
| 6,025,841 A | 2/2000 | Finkelstein et al. | |
| 6,160,554 A | 12/2000 | Krause | |
| 6,429,855 B2 | 8/2002 | Pabon | |
| 6,489,975 B1 | 12/2002 | Patil et al. | |
| 6,590,593 B1 | 7/2003 | Robertson et al. | |
| 6,750,858 B1 * | 6/2004 | Rosenstein | 715/790 |
| 6,781,611 B1 | 8/2004 | Richard | |

(Continued)

FOREIGN PATENT DOCUMENTS

JP 4057089 2/1992

(Continued)

OTHER PUBLICATIONS

Display Configuration; pp. 1-13; www.nvidia.com/objective/feature_nview.html.

(Continued)

*Primary Examiner*—Ting Lee
(74) *Attorney, Agent, or Firm*—Shook, Hardy & Bacon LLP

(57) ABSTRACT

A mode of managing windows in a graphical user interface in which the application windows may be presented in a tiled manner is provided. Upon invocation of the mode inactive application windows may be scaled down and organized in a manner so as to set them aside from the currently active application window while the active application window may remain at or near full size and be positioned in a centralized location in the desktop space.

20 Claims, 13 Drawing Sheets

U.S. PATENT DOCUMENTS

| | | | |
|---|---|---|---|
| 6,806,892 B1 | 10/2004 | Plow et al. | |
| 6,909,443 B1 | 6/2005 | Robertson et al. | |
| 6,957,395 B1 | 10/2005 | Jobs et al. | |
| 7,496,846 B2 * | 2/2009 | Malmstrom | 715/734 |
| 2001/0028368 A1 | 10/2001 | Swartz | |
| 2002/0054141 A1 | 5/2002 | Yen et al. | |
| 2003/0184592 A1 | 10/2003 | Awada et al. | |
| 2004/0066408 A1 | 4/2004 | Meyers et al. | |
| 2004/0066414 A1 | 4/2004 | Czerwinski et al. | |
| 2004/0165010 A1 | 8/2004 | Robertson et al. | |
| 2004/0207663 A1 | 10/2004 | Asakura | |
| 2004/0210847 A1 | 10/2004 | Berson et al. | |
| 2004/0261037 A1 * | 12/2004 | Ording et al. | 715/788 |
| 2004/0261039 A1 * | 12/2004 | Pagan | 715/797 |
| 2005/0010876 A1 | 1/2005 | Robertson et al. | |

FOREIGN PATENT DOCUMENTS

| | | |
|---|---|---|
| JP | 7021400 | 1/1995 |
| JP | 2001/222406 | 8/2001 |
| JP | 2003/186593 | 7/2003 |

OTHER PUBLICATIONS

Dynamic Space Management for User Interfaces; Blaine A. Bell and Steven K Feiner; pp. 1-4; www1.cs.columbia.edu/~ blaine/SpaceManager/.

Elastic Windows for Rapid Multiple Window Management; Eser Kandogan and BenShneiderman; pp. 1-2; www.cs. umd.edu/hcil/elastic-windows/.

Managing Multiple Windows; pp. 1-3; http://developer.apple.com/documentation/mac/Toolbox/Toolbox-202.html.

WindowShade X; Released Feb. 22, 2005; pp. 1-2; www.unsanity.com/haxies/wsx/.

The TaskGallery, http://research.microsoft.com/ui/TaskGallery.

U.S. Appl. No. 09/540,744, filed Mar. 31, 2000, Robertson et al.

U.S. Appl. No. 10/851,928, filed May 21, 2004, Horvitz et al.

* cited by examiner

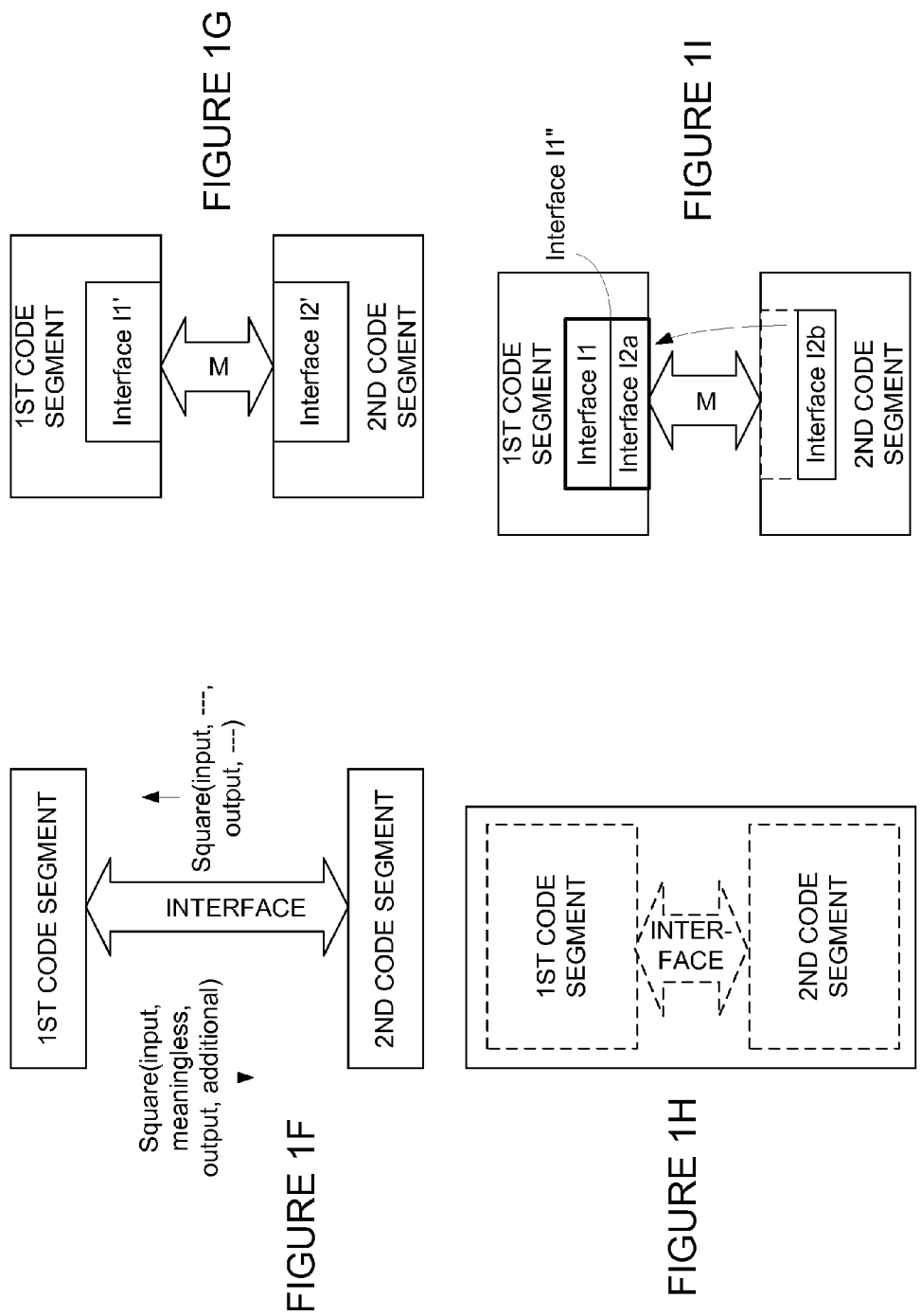

SYSTEM AND METHOD FOR PROVIDING A WINDOW MANAGEMENT MODE

CROSS REFERENCE TO RELATED APPLICATION

This application is a divisional of prior U.S. application Ser. No. 11/117,717, filed Apr. 29, 2005, the entire contents of which are incorporated herein by reference.

FIELD OF THE INVENTION

Aspects of the present invention are directed generally to managing the presentation of user interface elements in or with an operating system. More particularly, aspects of the present invention are directed to a method and system for applying a mode of operation for managing the presentation of application windows in or with an operating system.

BACKGROUND

As the use of computers in both the workforce and personal life has increased, so has the desire to allow for easier use of them. Many operating systems today utilize a windows based configuration of application programs. Information is displayed on a display screen in what appears to be several sheets of paper.

As such, application windows are a core user interface facility of all graphical user interface (GUI) systems. While application windows may vary in appearance across systems, they share many common attributes such as the ability to be resized and repositioned and to exist among other application windows associated with different applications. Together, multiple application windows can appear simultaneously on the screen, layered on top of each other, typically represented by the order each window was last accessed by the user.

When multiple windows are open at the same time, locating, navigating and switching quickly to the desired window can be difficult. For example, the desired window may be partially or fully occluded by other open windows. Also, the desired window may be minimized or hidden. These scenarios are commonly referred to as window management problems.

Window selection interfaces have been proposed to resolve such window management problems by minimizing the necessity to sort through the various open windows.

Window management solutions in the Windows XP brand operating system by Microsoft Corporation include the Taskbar and Alt-Tab key combination, which each presents a list of open windows in a representation different from the primary window. In the Taskbar, a control representing each application window is duplicated and presented in a manner that avoids overlapping, allowing for an indirect mechanism to select a specific application window even if the window is presently obscured. The Alt-Tab keyboard combination invokes a secondary UI facility that, like the Taskbar control, presents a duplicate list of all open and available application windows from which the user can select from. These interfaces however, do not allow the user to view content of a window without the window being selected.

Recently, Apple Computing, Inc. introduced Exposé in the MAC OS X brand operating system. Exposé provides a user with the ability to display all open windows as thumbnails on the desktop. In operation, when the user types the F9 key, Exposé tiles all the open windows. Namely, Exposé scales the windows down to a size such that all the open windows are displayed in a non-overlapping form. In another aspect, Exposé provides a user with the ability to display and view all open windows in a particular application in a non-overlapping manner. Specifically, when the user types the F10 key, Exposé tiles all of the open windows for the current application in a non-overlapping form while fading to a gray all of the open windows associated with other applications. This facilitates the location and selection of a previously not visible application window, but does not support user-interaction with application windows while in this mode.

While Exposé allows the user to view open windows simultaneously, multiple windows are tiled on the screen, which can still lead to some confusion. In addition Exposé is a temporary state where once a user selects one of the tiled windows, the user interface returns to the Z-order state with the selected window located on top of the Z-order.

In one proposed implementation for the MAC OS X brand operating system, thumbnail controls for minimized application windows are presented in the Dock control and the active application window was presented by itself on the desktop space not occupied by the Dock control. To select another application to open, a user could select a thumbnail control of the application window in the Dock and the system would open the application window on the Dock and minimize to the Dock the previously open application window.

It would be beneficial to provide a window management solution which allows a user to provide all application windows in a tile type format and to allow a user to switch windows in and out of focus while maintaining a tiled view of the application windows not in focus.

SUMMARY

There is therefore a need to provide a window management solution that provides a facility in which application windows may be tiled and focus may be switched between tiled windows allowing a user to quickly and easily switch application windows in and out of focus.

The present invention addresses the window management problem by introducing a new mode of operation, which can be invoked, or removed at any time by the user. According to one aspect, the invention provides a method for in which all inactive application windows may be scaled and organized in a manner as to 'set them aside' from the currently active application window. In one implementation, in response to a command invoking the new window management mode, the active application window may remain at or near full size and be positioned in a centralized or 'ideal' location relative to the inactive application windows.

Benefits that may be realized by such organization include providing a user with a tool to readily identify the active and inactive application windows which are currently available for interaction. By maintaining all inactive windows visible and available at any time, the user can easily identify and quickly activate a desired application window. In addition, a user may work with multiple application windows without the application windows becoming overlapped or obscured by other application windows. In addition, user interactions with the active application window are unaffected while the new window management mode is invoked. Inactive application windows, while scaled down in size, remain 'live' insofar as they can continue to update their content (i.e. refreshing a web page or playing video). The user may not interact with inactive application windows until they are made the active application window.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

FIGS. 1B through 1M show a general-purpose computer environment supporting one or more aspects of the present invention;

DETAILED DESCRIPTION OF ILLUSTRATIVE EMBODIMENTS

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1A:
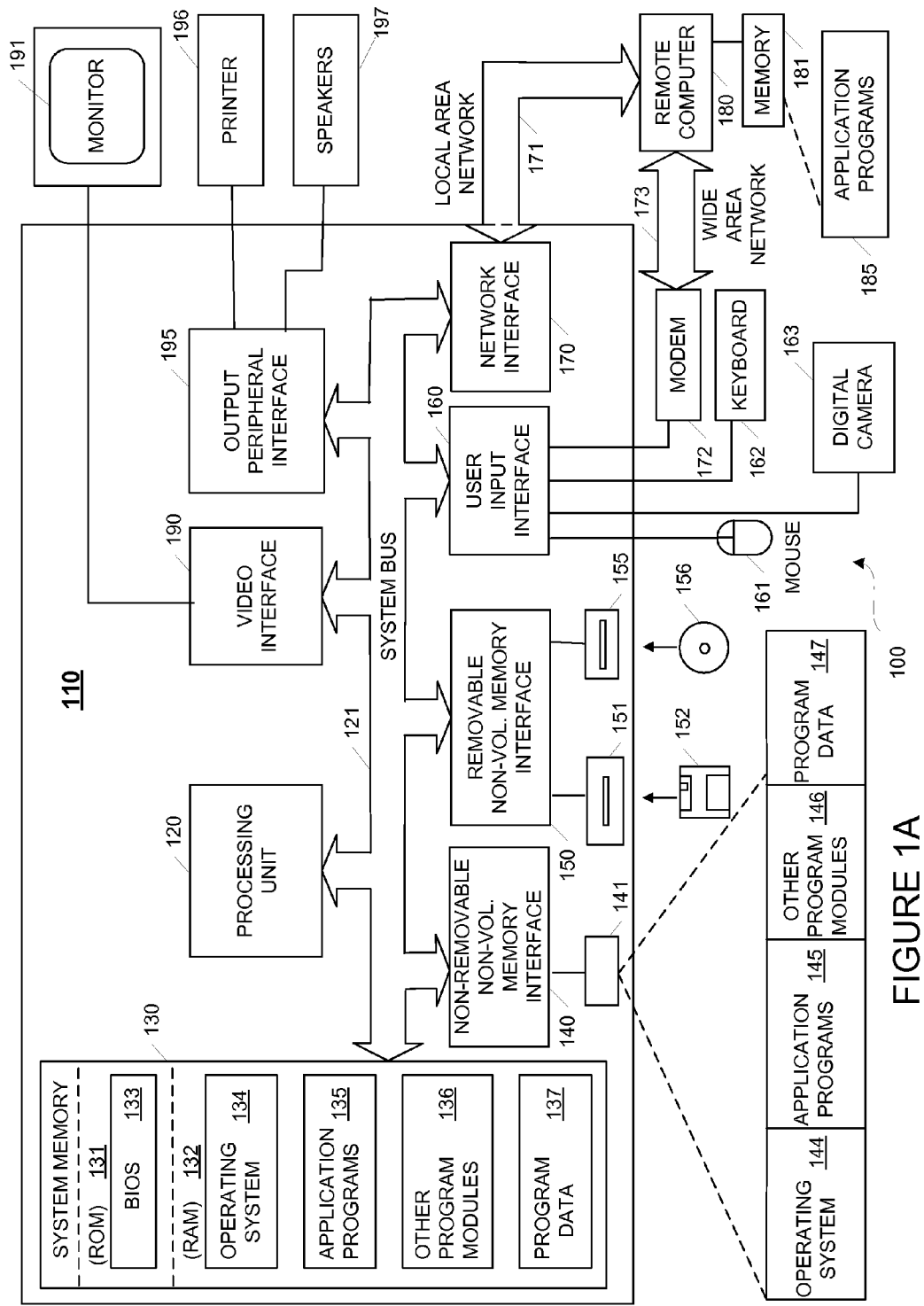
FIG. 1A illustrates a schematic diagram of a general-purpose digital computing environment in which certain aspects of the present invention may be implemented.

FIG. 1A illustrates an example of a suitable computing system environment 100 on which the invention may be implemented. The computing system environment 100 is only one example of a suitable computing environment and is not intended to suggest any limitation as to the scope of use or functionality of the invention. Neither should the computing system environment 100 be interpreted as having any dependency nor requirement relating to any one or combination of components illustrated in the exemplary computing system environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1A, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1A illustrates operating system 134, application programs 135, other program modules 136, and program data 137.

The computer 110 may also include other removable/non-removable, volatile/nonvolatile computer storage media. By way of example only, FIG. 1A illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like.

The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media discussed above and illustrated in FIG. 1A, provide storage of computer readable instructions, data structures, program modules and other data for the computer 110. In FIG. 1A, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a digital camera 163, a keyboard 162, and pointing device 161, commonly referred to as a mouse, trackball or touch pad. Other input devices (not shown) may include a pen, stylus and tablet, microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1A. The logical connections depicted in FIG. 1A include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1A illustrates remote application programs 185 as residing on memory device 181. It will be appreciated that the network connections shown are exemplary and other means of establishing a communications link between the computers may be used.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, subroutines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
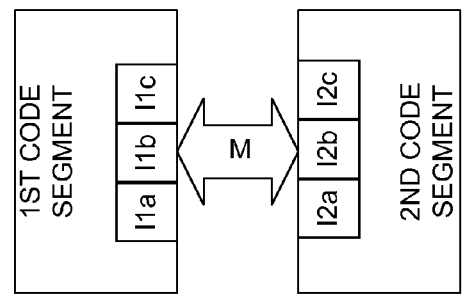
Figure 1E:
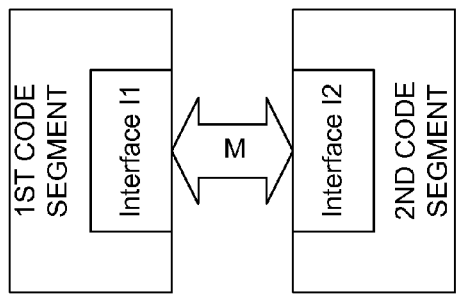
Figure 1B:
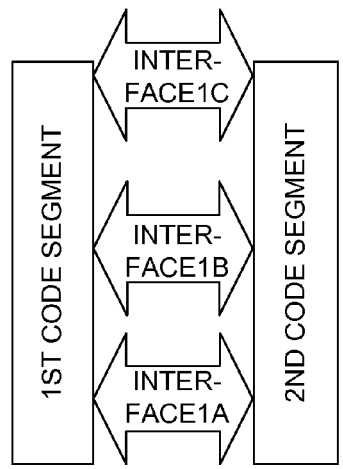

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bi-directional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
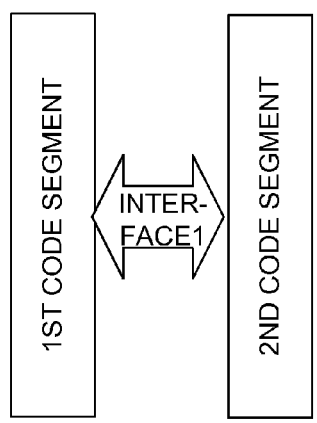

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2$a$ and I2$b$, and interface portion I2$a$ has been coded in-line with interface I1 to form interface I1". For a concrete example, consider that the interface I1 from FIG. 1C performs a function call square (input, output), which is received by interface I2, which after processing the value passed with input (to square it) by the second code segment, passes back the squared result with output. In such a case, the processing performed by the second code segment (squaring input) can be performed by the first code segment without a call to the interface.

D. Divorce

Figure 1K:
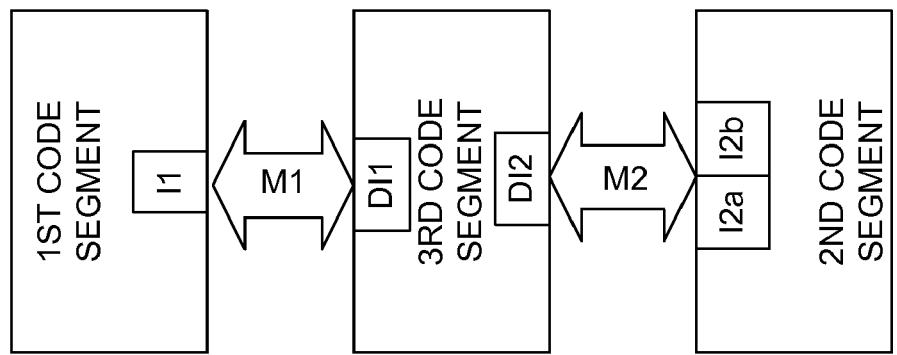
Figure 1J:
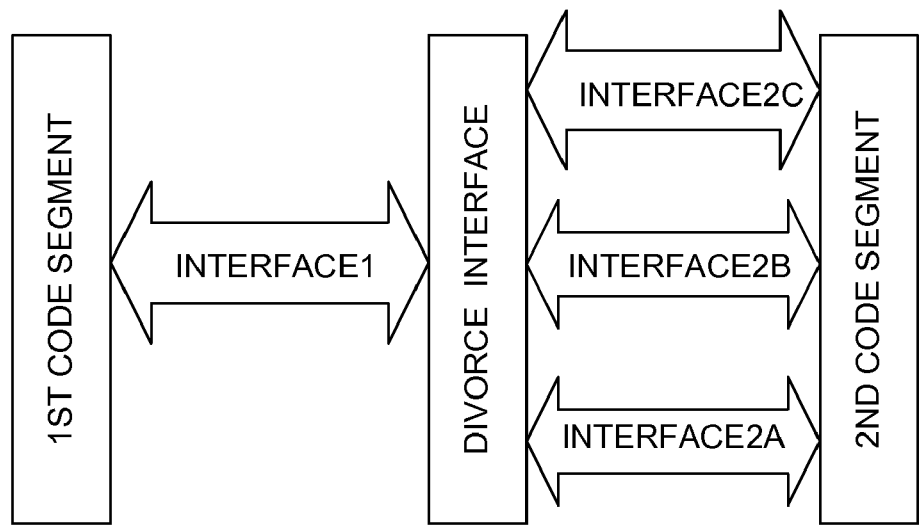

A communication from one code segment to another may be accomplished indirectly by breaking the communication into multiple discrete communications. This is depicted schematically in FIGS. 1J and 1K. As shown in FIG. 1J, one or more piece(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
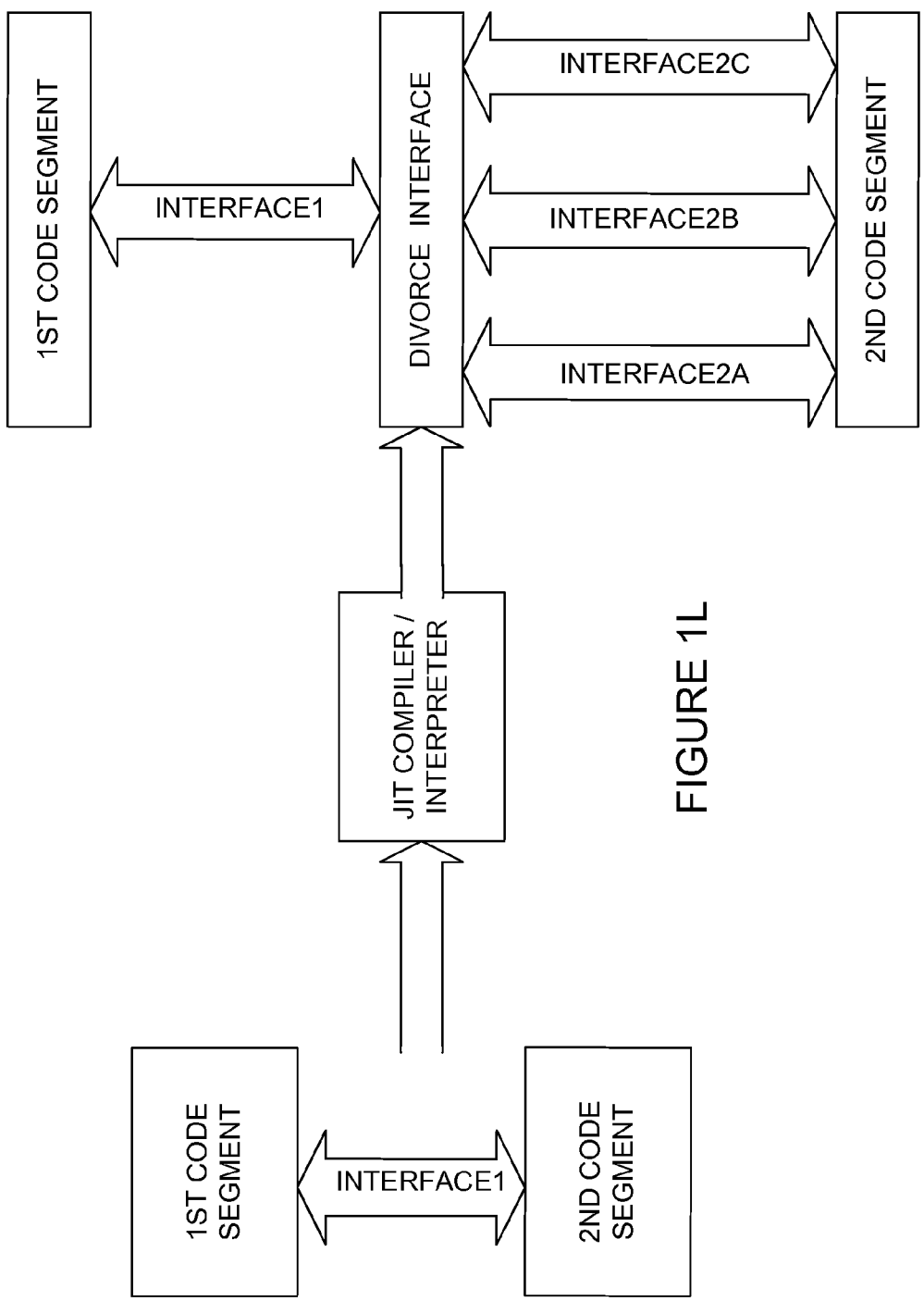
Figure 1M:
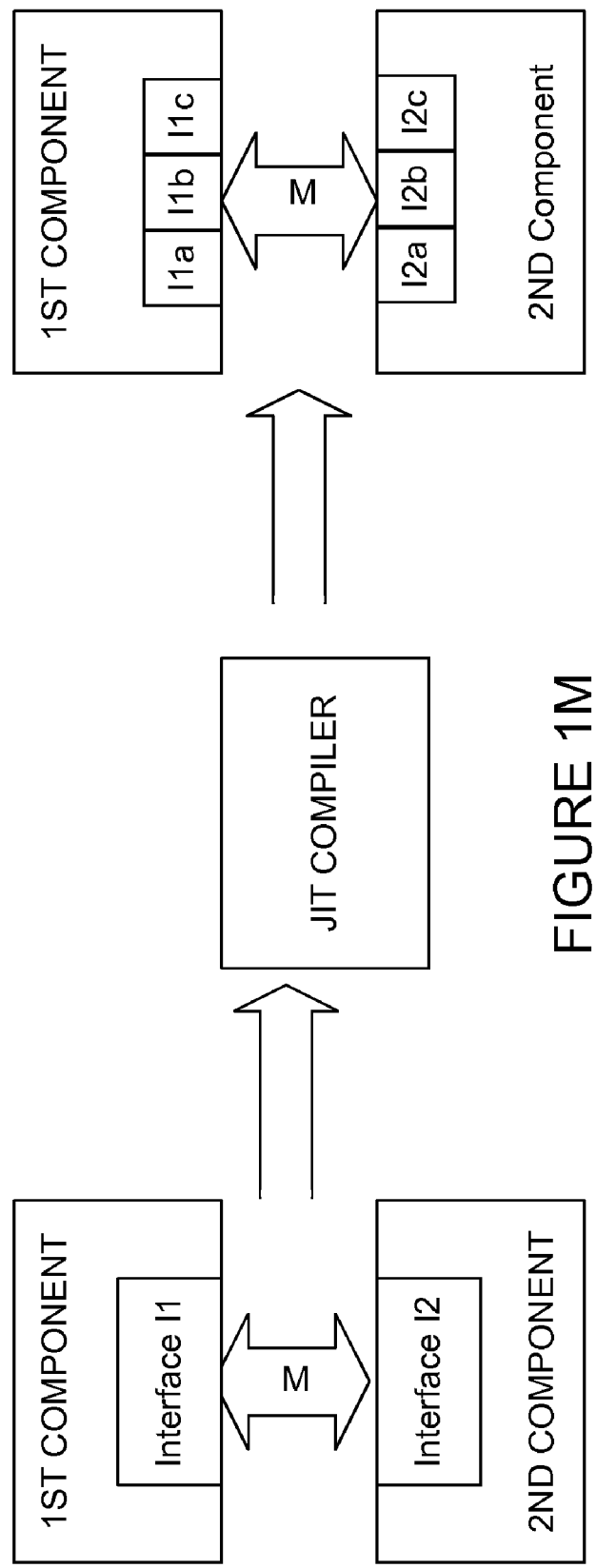

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Illustrative Embodiments

Figure 2:
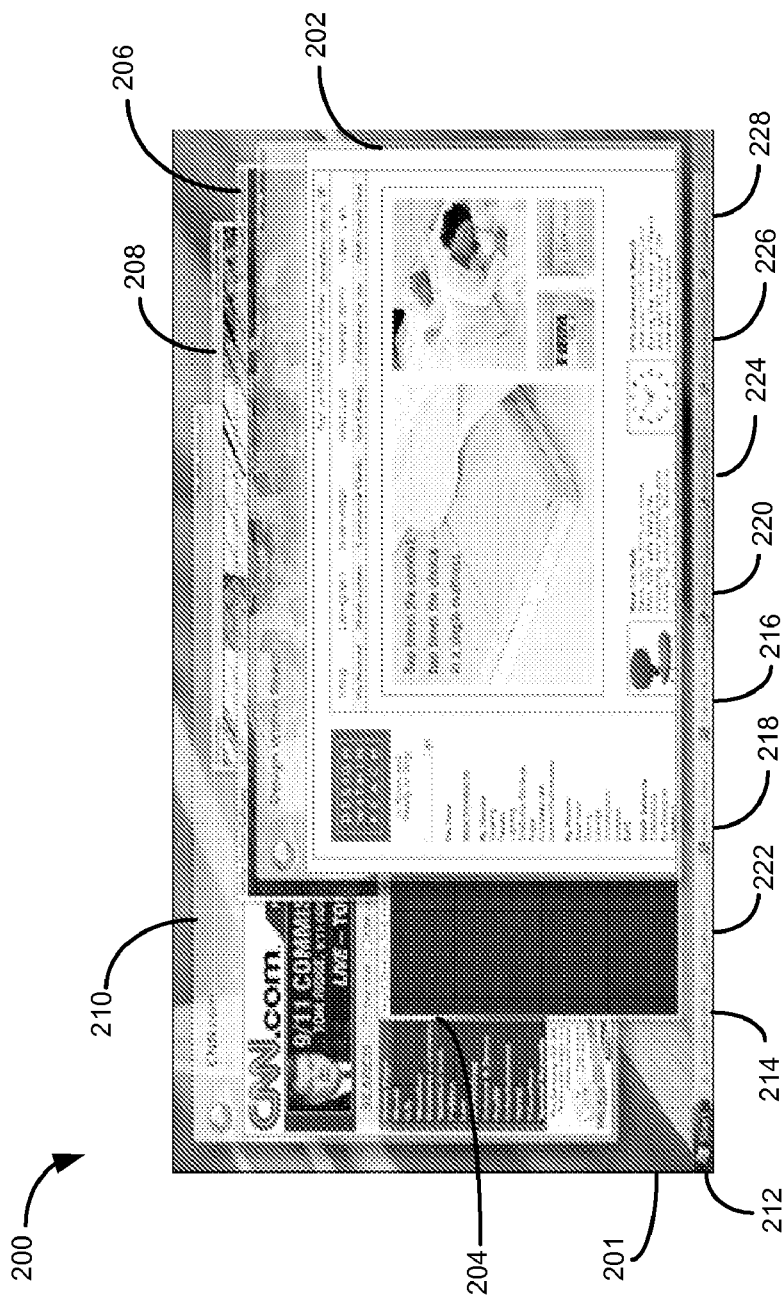
FIG. 2 illustrates a display scenario showing a plurality of an application windows rendered in a Z-order configuration.

FIG. 2 illustrates a display scenario 200 with multiple open windows overlapping each other. Various windows 202, 204, 206, 208, and 210 are shown in a Z-order orientation. It should be understood by those skilled in the art that the Z-order of an orientation of windows is very well known in the art. In FIG. 2, window 202 is higher in the Z-order than windows 204, 206, 208, and 210. Window 204 is higher in the Z-order than windows 206, 208, and 210. Window 206 is higher in the Z-order than windows 208 and 210. Window 208 is higher in the Z-order than window 210. Window 210 is at the bottom of the Z-order in this example. As used herein, the term "orientation" is defined herein to include adjustments to the visual appearance of a window or group of windows, such as the size or shape of the window and a shared common border between or around at least two windows.

For purposes of this invention "desktop space" is an area of a display that allows for the display of windows corresponding to application programs, i.e., application windows. Desktop space 201 in FIG. 2 provides such an example. The taskbar 212 at the bottom of the display indicates the windows that are currently in use, which may be visible or minimized. A taskbar is a specific implementation of an on-screen window remote control used to list and enable manipulation of windows, such as activating, moving, hiding, and minimizing. It will be appreciated that the desktop space is separate from and does not overlap controls on the display such as the taskbar.

Window 202 may be represented by taskbar button 214. Window 204 may be represented by taskbar button 216. Window 206 may be represented by taskbar button 218. Window 208 may be represented by taskbar button 220. Window 210 may be represented by taskbar button 222. Taskbar buttons 224, 226 and 228 represent application windows, which have been hidden or minimized. An application window in the Z-order may become hidden when one or more application windows in the Z-order completely obscure the subject application window. Also, an application window may become hidden automatically after a predetermined time of inactivity. For example, if a user has not interacted with an application window for thirty minutes that application window may be removed from the desktop space 201, but remain accessible to the user through a taskbar button 214 corresponding to the application window. An application window may become minimized in response to a user command. As shown in the FIG. 2 example, five windows are shown open in the desktop space 201 while eight windows including three hidden or minimized windows are visually represented on the taskbar 212. The taskbar button order may indicate the order in which the corresponding windows were first opened from left to right (not shown).

The display scenario 200 in FIG. 2 illustrates a common problem with graphical user interface systems. In FIG. 2, at least application windows, 204, 206, 208 and 210 are partially obscured by one or more other application windows positioned above them in the Z-order. As such, the content and the accessibility of the underlying application windows may be difficult to discern.

According to aspects of the invention, a new mode of operation for window management is introduced. In certain aspects, the new mode may be invoked or removed at any time by a user. For example, a user may issue a command such as a keyboard or mouse command to invoke or activate the mode and similarly to deactivate the mode. In one aspect, the new window management mode of operation may be invoked from a display scenario 200. For purposes of this description, the new mode of operation will be described as if it were invoked from display scenario 200 shown in FIG. 2. It will be appreciated that the mode may be invoked from many different display scenarios at any time. Alternatively, the new window management mode of operation may be configured as a default mode. Invocation of the window management mode may not impact typical user interaction with application window content and controls (i.e., buttons and text fields). In at least some aspects, a user may conduct all tasks while in this new mode of operation, which she could have conducted with the application windows in the display scenario 200.

According to some aspects, the mode provides a method for managing the presentation of inactive windows where the inactive application windows are scaled down in size and organized in a manner as to 'set them aside' from the currently active window. For purposes of this invention, the term "scaled down" will be defined to mean a reduction in size to sufficiently differentiate the inactive application windows from the active application window, for example the inactive application windows could be reduced 50% or more in size. The degree of scaling allows for the inactive application windows to be clearly delineated from the active application windows, yet is not so drastic that the scaled down application windows are unrecognizable. The degree of scaling may be preset or may fall within a prescribed range depending on the number of inactive application windows or may be some other function depending on the inactive application windows. In certain aspects, it is preferable that scaling be done to maintain the relative aspect ratios to aid users in identifying the scaled down application windows.

Benefits that may be realized by such organization include providing a user with a facility to readily identify the active and inactive application windows which are currently available for interaction. By maintaining all inactive windows visible and available at any time, the user can easily identify and quickly activate a desired application window. In addition, a user may view or work with multiple application windows without any of the application windows being overlapped or obscured by other application windows.

According to some aspects, upon invoking the mode of operation, the active application window is rendered at or near full size and may be positioned in a location on the desktop space relative to the inactive application windows. In certain aspects the location may be dynamically determined by the computer system based on the available desktop space, the size of the active application window and the number of total windows. In this instance, the system may be considered to be determining an "ideal" location. Alternatively, the location may be preconfigured by the user. For purposes of this invention, "full size" refers to the size of the application window prior to invocation of the mode and "near full size" refers to at least 80% of full size and may be greater than full size.

From an operations standpoint, according to one aspect, invocation of the mode does not impact the underlying functionality of the application windows. For example, user interactions with the active application window will not be affected when the mode is invoked. Although inactive application windows are scaled down in size, they remain "live" and have their content continually updated (i.e. refreshing a web page or playing video). However, in some aspects user interaction with an inactive application window does not occur until that application window is made active.

Other aspects of the invention allow an inactive application window to become the active window by swapping positions with an active application window in response to a user selecting the inactive application window. In these aspects, the inactive application window when selected is resealed to at or near full size and switches relative positions with the previously-active application window, which is scaled down in size. This behavior is somewhat analogous to the known behavior of selecting an inactive application window which is below an active application in the Z-order, where the inactive application window becomes the topmost window in the Z-order and active.

Figure 3:
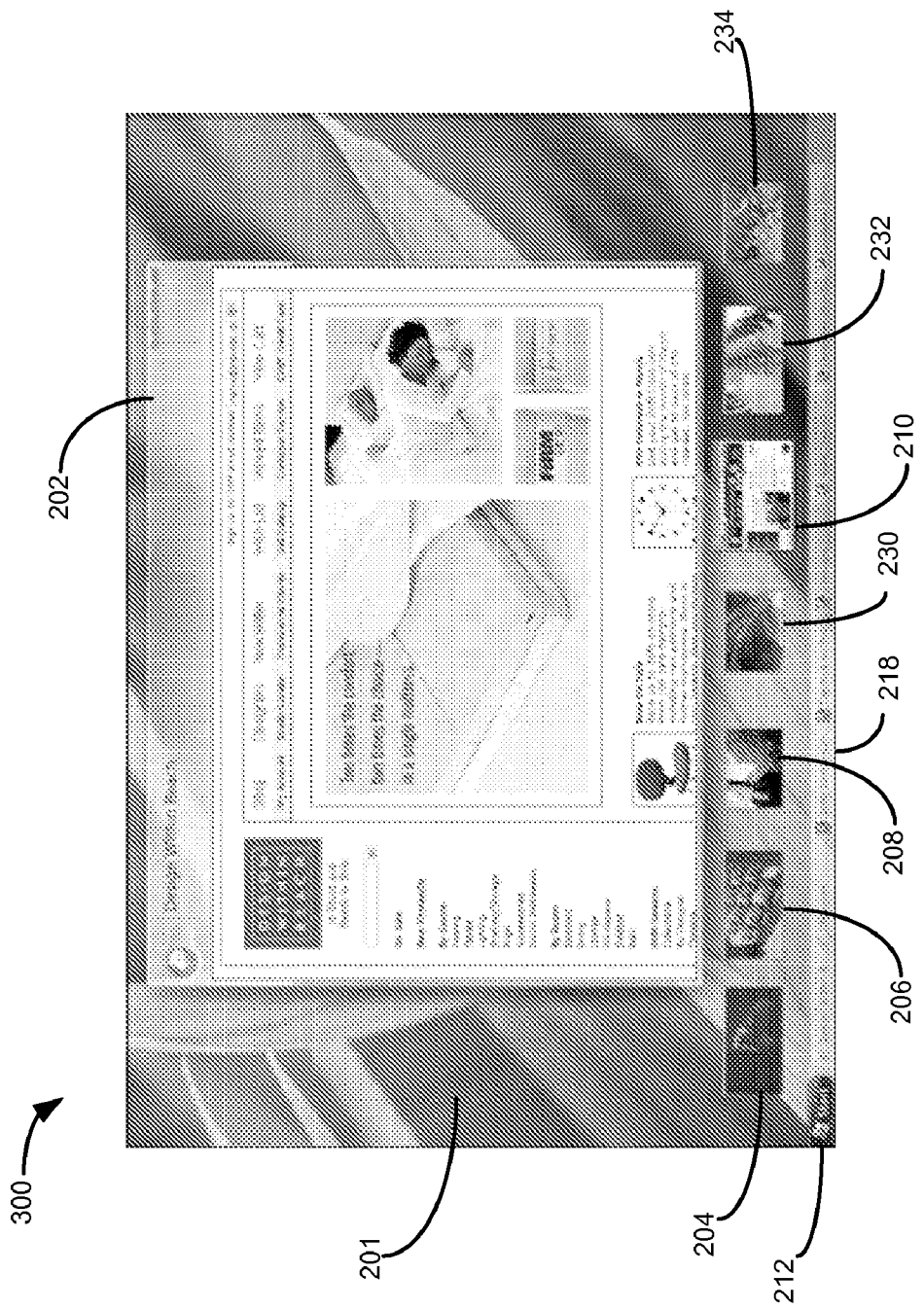
FIG. 3 illustrates a display scenario showing a plurality of application windows rendered in accordance with one aspect of the present invention.

FIGS. 3-6 provide display scenarios that will be used to illustrate some of the above-described aspects. Referring to FIG. 3, invocation of the window management mode from the display scenario 200 of FIG. 2, results in the display scenario 300. Invocation of the window management mode may occur in response to a command such as a user selection of an input control representing, a keyboard entry (such as the Win-Tab keyboard), a voice command, or other type of user input. The application windows may transition from the display scenario 200 to the display scenario 300 by animation.

In response to invocation of the mode, all inactive application windows whether displayed, hidden or minimized may be scaled and positioned in the desktop space 201 such that all of the windows are visible and none of the application windows overlap. The active application window is rendered at or near full size and may be repositioned within the desktop space 201, for example to accommodate display of the scaled down inactive application windows. Referring to FIG. 3, the active application window 202 is the same application window which was active and at the top of the Z-order in FIG. 2. The inactive application windows rendered in scaled down form include each application window which was at least partly visible in the desktop space 201 in FIG. 2 including application windows 204, 206, 208 and 210 as well as application windows 230, 232 and 234 which were hidden or minimized and correspond to taskbar buttons 224, 226 and 228 in FIG. 2. In the FIG. 3, the display scenario 300 shows the inactive application windows rendered in a row in the desktop space 201 above the taskbar control 212, though this presentation style is merely illustrative.

In some aspects of the invention, upon invocation of the mode, the active application window may be repositioned to a predetermined position or a position determined based upon the current conditions. The current conditions may include, among other things, the number of inactive application windows, the degree of scaling of the inactive application windows, the positions in the desktop space where the scaled down windows will be rendered in response to the command invoking the mode, the orientation of the screen (e.g., portrait) and the total area of the desktop space. Generally speaking, an algorithm may be used to consider one or more of the aforementioned conditions to determine the positioning of the active application window. In some aspects, the active application window may be centered within the available desktop space based on the boundaries of the desktop space and the location where the inactive application windows will be rendered. FIG. 3 shows the active application window 202 in such a centered location. Alternatively, the position at which the active application window is rendered may be preconfigured by the user or the user may select the parameters that affect where the active application window is positioned.

Following invocation of the new mode, the user can still continue to interact with the active application window in the typical manner. In at least one aspect, no window or control interactions are affected by invocation of the new window management mode. Also, in certain aspects, the window management mode may be toggled off, using a command such as a command similar to those described for invoking the mode. When the mode is toggled off from the display scenario 300, the display scenario may return to the display scenario 200. Alternatively, the inactive application windows which were previously minimized or hidden may be rendered in the desktop space 201 in the Z-order. Of course, interactions with the application windows in the new mode of operation may impact how and if the application windows are rendered in the desktop space 201 and where in the Z-order the application windows are positioned when the mode is toggled off.

Figure 4:
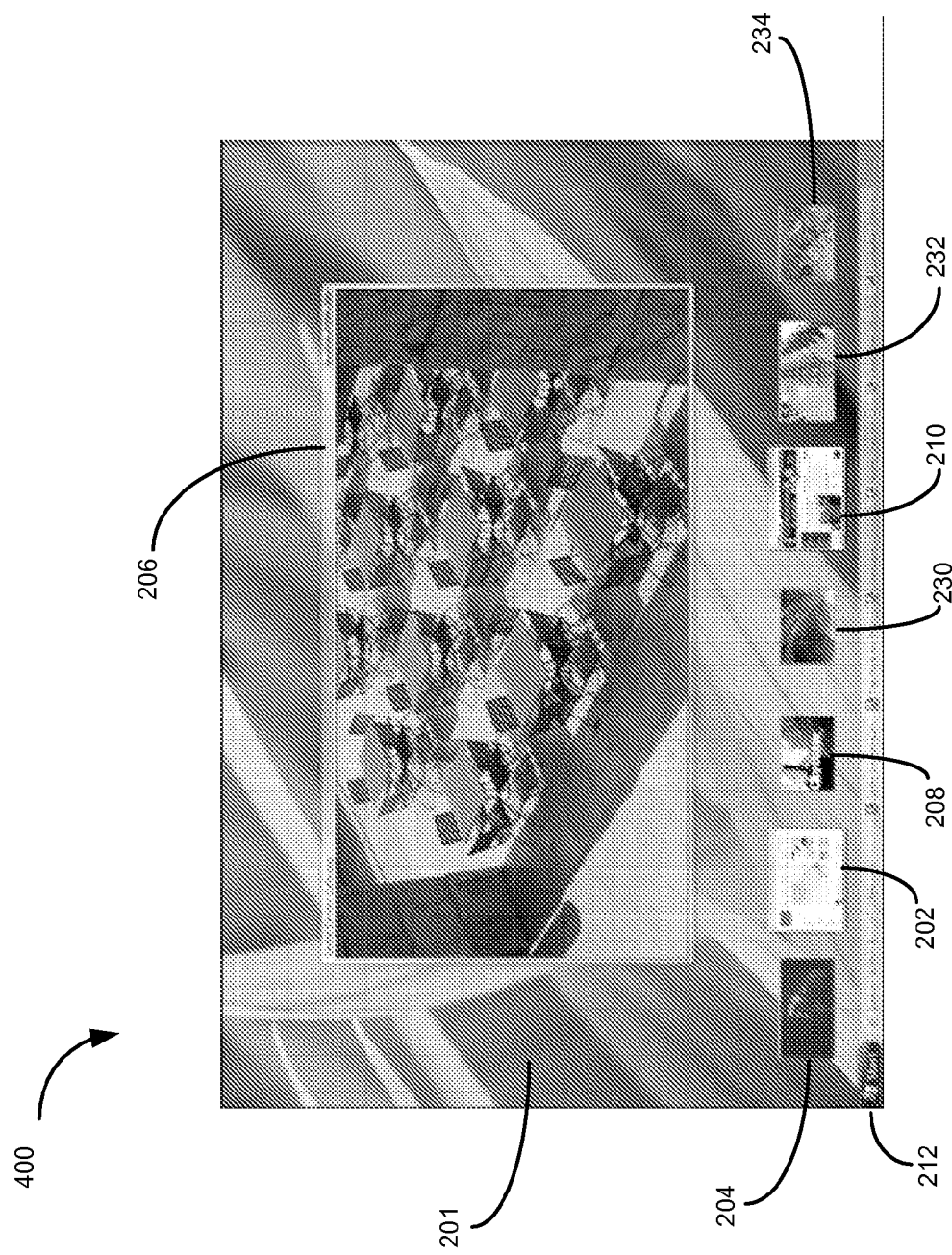
FIG. 4 illustrates a display scenario showing a plurality of application windows rendered in accordance with another aspect of the present invention.

Selection of an inactive application window from the row of scaled down inactive application windows or its corresponding taskbar button in FIG. 3 swaps that window the active application window 202. Thus, a user issuing a command, such as through a pointing device, selecting the scaled down inactive application window 206 or selecting the taskbar button 218 corresponding to the inactive application window 206 causes the inactive application window 206 and the active application window 202 to swap relative positions in the desktop space 201 as depicted in FIG. 4. In this instance, the inactive application window 206 is made the active application window and rendered at or near full size in the same relative position that the previously active application window 202 occupied. Also, the application window 202 is made an inactive application window and rendered in a scaled down form in the row of inactive application windows in the desktop space 201. The swapping of relative positions may be carried out with the application windows transitioning by animation from one position to the other. For example, simultaneously, the inactive application window may grow (scales up) to replace the active application window, while the active application window shrinks (scales down) to replace the previously-inactive application window. As implicitly described with respect to FIGS. 3 and 4, aspects of the invention provide a dedicated facility for inactive application windows separate and apart from the taskbar 212 by which a user can select an application window for interaction.

Figure 5:
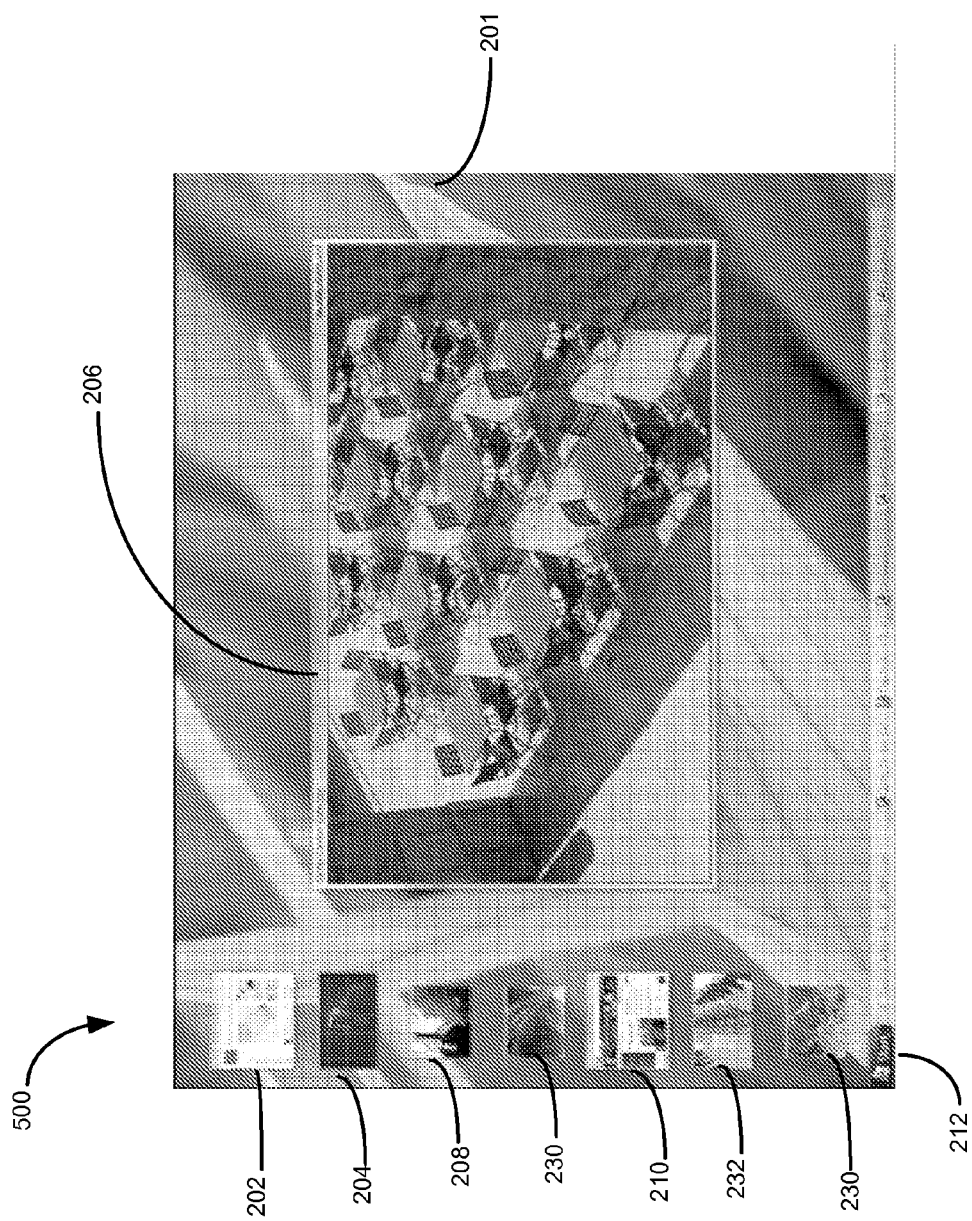
FIG. 5 illustrates a display scenario showing a plurality of application windows rendered in accordance with still another aspect of the present invention.

It will be appreciated that the inactive application windows may be rendered in different presentation styles such as in a horizontal orientation with a row at the top of the desktop space 201, or in a vertical orientation with a column down the side of the desktop space such as shown in FIG. 5, a combination of a column and a row, or any other orientation, which allows a user to readily identify the active application window and each of the inactive application windows. According to one aspect, where a user has two display monitors, the active application window may be rendered on one display screen and the inactive applications may be scaled down and rendered on the second display screen. In order to accommodate application windows of differing sizes and orientations, the facility that manages the presentation of the inactive application windows can collectively scale all, or individually reposition windows to ensure all windows remain in the desktop space 201. In instances where many inactive windows are included it may be appropriate to render the active application window below, but near the full size of the application window. It will be appreciated that a user may issue a command when in a presentation style (e.g., horizontal orientation) such as FIG. 4 to change to a presentation style (e.g., vertical orientation) such as in FIG. 5. Such changes between alternate presentation styles may occur by an animated transition. Also, the active application window 206 may change relative positions when the presentation styles change to be in a more central location with respect to the desktop space 201, such as shown between FIGS. 4 and 5.

According to another aspect of the invention, additional application windows may be removed from the facility managing the list of inactive application windows. To accommodate users who are familiar with managing multiple open application windows, or users who wish to exploit the power of multiple open application windows (i.e. for drag and drop tasks), the new mode may allow additional application windows to be included with the active application window. In this instance, an inactive application window may be removed from the list of inactive application windows which are scaled down and instead be rendered at or near full size with active application window. While this aspect re-introduces application window management problems, it does on a user-controlled basis with a smaller, more manageable set of application windows.

Figure 6:
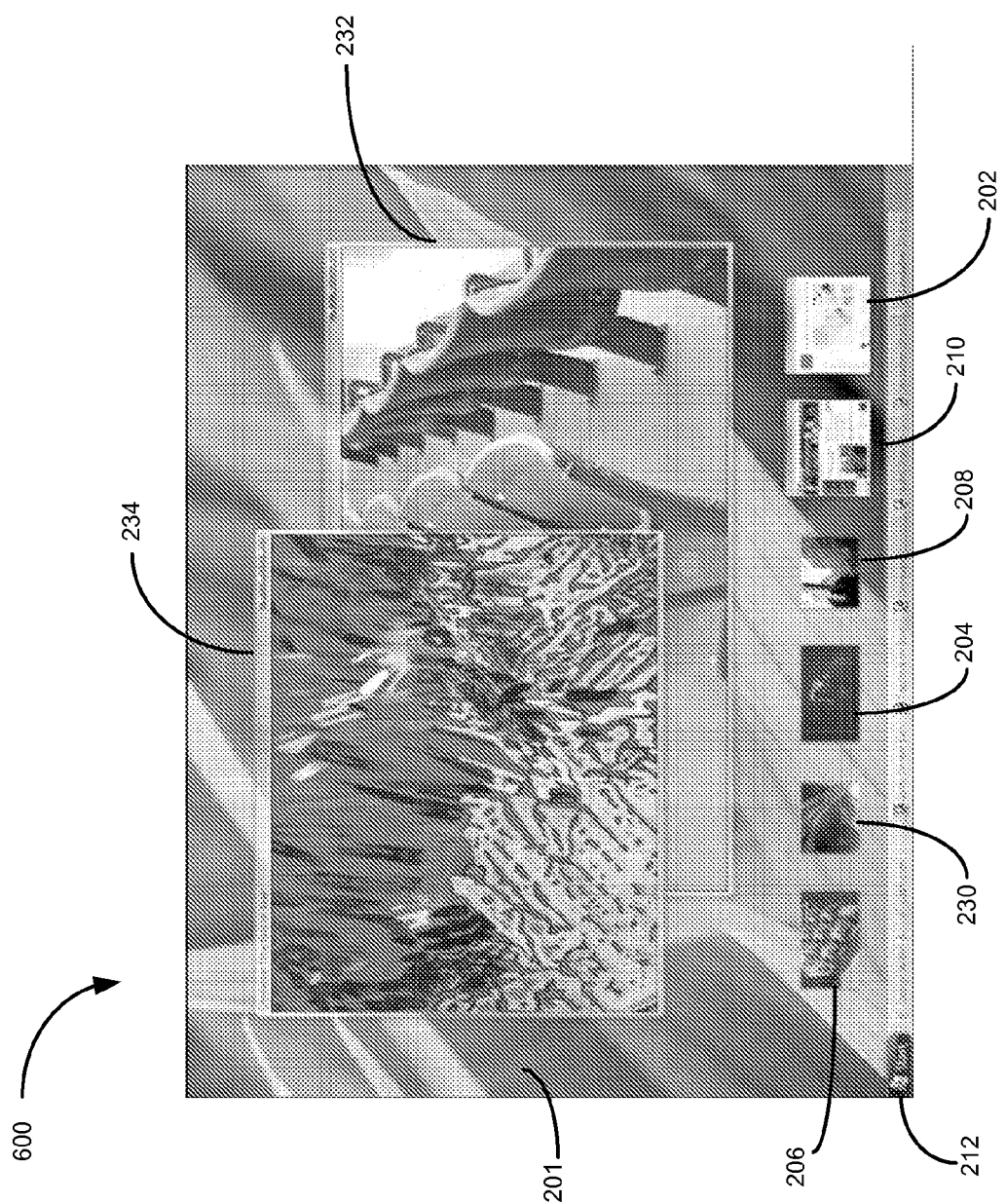
FIG. 6 illustrates a display scenario showing a plurality of application windows rendered in accordance with yet another aspect of the present invention.

An example of this implementation will be described with reference to FIG. 6. According to FIG. 6, a user by issuing a special command, such as a right click while hovering over an inactive application window or keyboard input, may identify an additional window to be rendered at or near full size with the active application window. In the example of FIG. 6, application window 232 was the active application window when in response to a user command selecting application window 234 to be removed from the list of inactive application windows managed by the facility, application window 234 was rendered at or near full size and became the active application window overlapping the previously active application window 232. A user may then perform operations involving two windows such as drag and drop operations with both application windows at or near full size. In this instance, a user may interact with the application windows 232 and 234 in the same manner as a user might interact with the application windows in the desktop space 201 of FIG. 2. For example, selection of application window 232 would move that window to the top of the Z-order overlapping application window 234. Other inactive application windows may be added to this group by using the special command. This special command may be toggled off in which case each application window not in focus would be rendered in a scaled down form with the other inactive application windows which remain on the facility's list of inactive application windows.

If the user were to issue a normal selection command selecting inactive application window 230 in FIG. 6 similar what was described with respect to FIG. 3, inactive application window 206 selected would swap relative positions in the desktop space 201 with the application window 234 and would become the active application window and overlap the application window 232.

Figure 7:
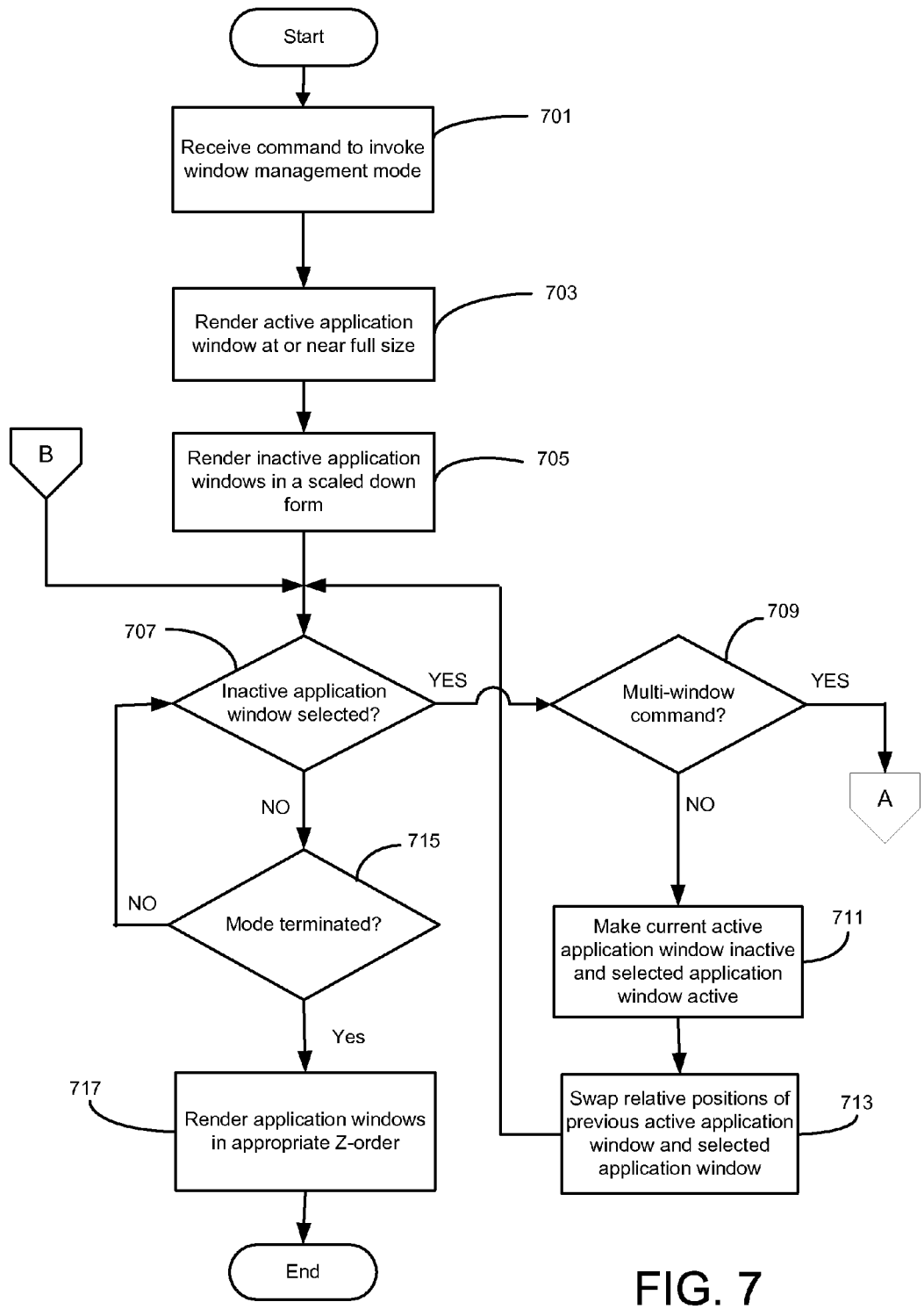
FIGS. 7 and 8 provide a flowchart of an illustrative example of implementing the present invention.

FIG. 7 provides a flowchart showing the steps involved in an illustrative implementation of the present invention. In step 701, the operating system receives a command to invoke the new window management mode. In step 703, the active application window is rendered at or near full size and in step 705, the inactive application windows are set aside from the active application window and rendered in a scaled down form, where none of the application windows overlap one another. In step 707, the operating system determines whether a command has been received selecting an inactive application window, either directly or via a taskbar button. If so, then in step 709, the operating system determines whether the selection command is a special command requesting removal of an inactive application window from the window management facility. If not, then operation of the mode proceeds with the current active application being made inactive and the selected inactive application window being made active in step 711. In step 713, the previous active application window and the selected application window swap relative positions with the previous active application window being rendered in a scaled down form and the selected application window being rendered at or near full size. Thereafter control returns to step 707.

If in step 707, no inactive application window is selected then at step 715, the operating system determines whether the window management mode has been terminated or otherwise turned off. If the mode has been terminated, then in step 717 the application windows are rendered as appropriate in a Z-order presentation, where certain windows may not be displayed in the Z-order and may be hidden or minimized depending on the circumstances. Thereafter, the process ends.

Figure 8:
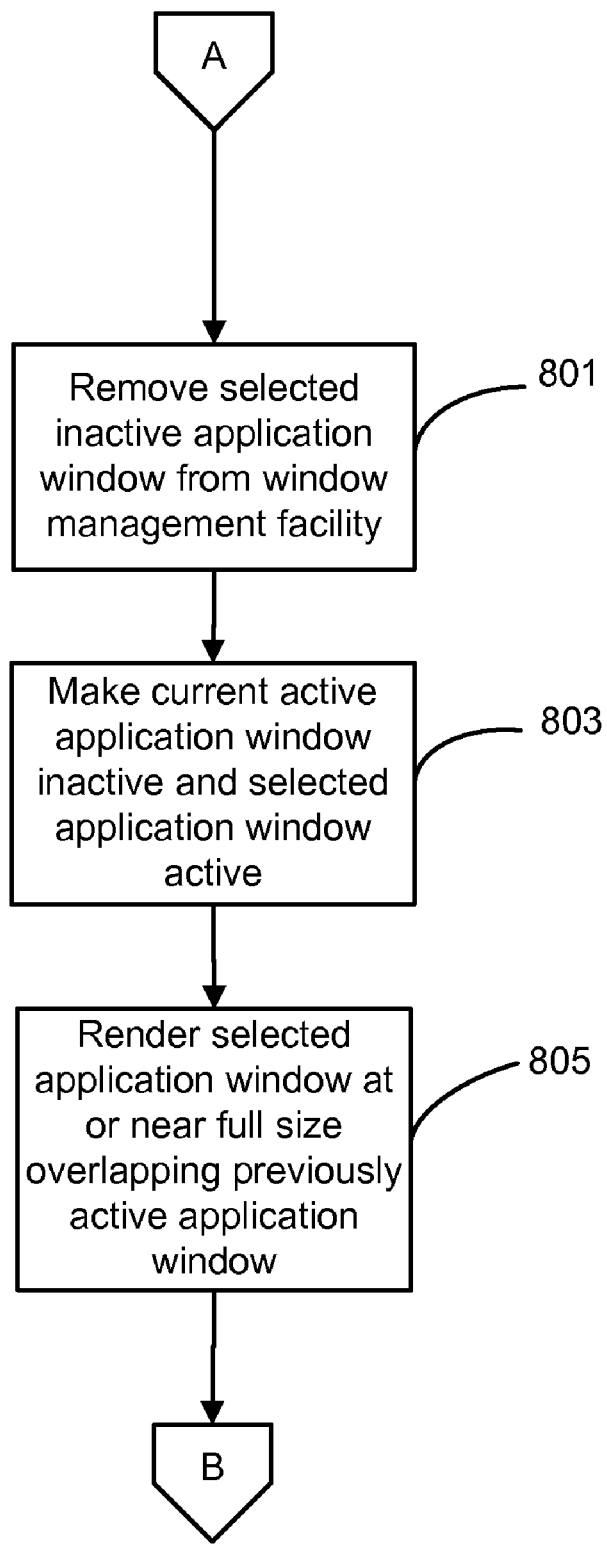

If in step 709, a special command request multi-window operation has been selected such as described with respect to FIG. 6, control shifts to step 801 in FIG. 8. In step 801, the selected inactive application window is removed from the list of inactive application windows managed by the window management facility. In step 802, the current active application window is made inactive and the selected application window is made active. In step 805, the selected application window is rendered at or near full size overlapping the previously active application window. Thereafter, control returns to step 707 in FIG. 7.

In another implementation of the present invention, various aspects of the present invention may be performed by an application programming interface (API). For example, public APIs may interface with an operating system to allow an operating system to provide the various features of the present invention. In one embodiment, a software architecture stored on one or more computer readable media for processing data representative of a Z-ordering of overlapping windows on a computer display includes at least one component configured to render the application window at the top of the Z-order at or near full size in a desktop space and render each application window below the top of the Z-order in a scaled down form in the desktop space, wherein none of the rendered application windows overlap one another; and at least one application program interface to access the component. An API may receive a request to manage the application windows by rendering the active application window at or near full size and scaling down the inactive application windows in size, access the necessary function(s) to perform the operation, and then send the results back to an operating system. The operating system may use the data provided from the API to perform the various features of the present invention.

In another implementation, a programming interface operable with an operating system, can perform the steps including intercepting an instruction to a destination module to render the active application window at the top of a Z-order and the inactive application windows below the active application window, and providing an instruction to the destination module to render the active application window at or near full size in the desktop space and to render the inactive application windows in a scaled down form in the desktop space, such that none of the rendered application windows overlap one another.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method for concurrently displaying a plurality of application windows on a display screen, the method comprising:

responsive to a first command, rendering plural application windows in a scaled down form in a desktop space and rendering a first application window at or near full size in the desktop space, wherein rendering the plural application windows in a scaled down form comprises reducing the plural application windows in size according to a degree of scaling, wherein the degree of scaling maintains a relative aspect ratio of the plural application windows, wherein the desktop space comprises an area of a display that allows for displaying windows corresponding to application program;

representing each of the plurality of application windows as corresponding buttons in a taskbar, wherein the desktop space is separate from and does not overlap the taskbar;

maintaining the underlying functionality of the plural application windows that are in the scaled down form by providing the plural application windows in a live state, wherein maintaining comprises:

(a) providing for user interaction with the scaled-down plural application windows, wherein no window interactions with the scaled-down plural application windows or control interactions with application functionality underlying the scaled-down plural application windows are affected by rendering the plural application windows in the scaled down form; and (b) automatically continually updating content within the scaled-down plural application windows that is presented on the display screen; and responsive to a second command, rendering a second application window at or near full size in the desktop space, wherein none of the plural application windows overlap the first and second application windows.

2. The method of claim 1, wherein one of the first application window and the second application window is at a top of a Z-order and overlaps the other of the first application window and the second application window.

3. The method of claim 2, wherein in response to user selection of the one of the first and second application windows below the top of the Z-order, moving the other of the first and second application windows to the top of Z-order.

4. The method of claim 2, further comprising:

in response to a third command, selecting a third application window, the third application window being one of the plural application windows;

rendering the third application window at or near full size in the desktop space and rendering the one of the first and second application windows at the top of the Z-order in a scaled down form in the desktop space, wherein none of the other plural application windows and the other of the first and second application windows overlap the third application window and the one of the first and second application windows, wherein application windows positioned below the application window at the top of the Z-order are partially obscured by other application windows.

5. The method of claim 4, wherein in response to the third command the third application window and the one of the first and second application windows at the top of the Z-order swap relative positions in the desktop space.

6. The method of claim 5, wherein swapping relative positions of the third application window and the one of the first and second application windows at the top of the Z-order in the desktop space comprises:
rendering the third application window at or near full size in the desktop space to a same relative position as the one of the first and second application windows at the top of the Z-order;
rendering the one of the first and second application windows at the top of the Z-order in a scaled down form in the desktop space to a same relative position as the third application window when in a scaled down form; and
transitioning by animation between both of the positions.

7. The method of claim 6, wherein transitioning by animation between both of the positions comprises:
growing the third application window to at or near full size in the desktop space to replace the one of the first and second application windows at the top of the Z-order; and
shrinking the one of the first and second application windows at the top of the Z-order to a scaled down form in the desktop space to replace the third application window when in a scaled down form.

8. The method of claim 4, wherein the third command comprises issuing a right click while hovering over the third application window when in a scaled down form, and wherein the third command is issued distinctly from the first command and the second command.

9. The method of claim 1, wherein rendering a second application window at or near full size in the desktop space comprises positioning the second application window in a location relative to inactive application windows as dynamically determined by a computer system.

10. The method of claim 9, wherein dynamically determining the location relative to inactive application windows comprises determining the location based on available desktop space, a size of the rendered second application window, and a total number of the inactive application windows.

11. The method of claim 1, wherein rendering a second application window at or near full size in the desktop space comprises positioning the second application window in a location preconfigured by a user.

12. A method for concurrently displaying a plurality of application windows on a display screen, the method comprising:
receiving a command that invokes a window management mode;
rendering all inactive applications of the plurality of application windows in a scaled down form in a desktop space;
maintaining the underlying functionality of the plural application windows that are in the scaled down form by providing the plural application windows in a live state, wherein maintaining comprises:
(a) providing for user interaction with the scaled down plural application windows, wherein no window interactions with the scaled down plural application windows or control interactions with application functionality underlying the scaled down plural application windows are affected by rendering the plural application windows in the scaled down form; and
(b) automatically continually updating content within the scaled down plural application windows that is presented on the display screen;
receiving a first selection that identifies one of the inactive applications, of the plurality of application windows in a scaled down form, to become an active application;
rendering the selected inactive application of the plurality of application windows as a first active application window at or near full size in the desktop space, wherein the desktop space comprises an area of a display that allows for displaying windows corresponding to application programs;
representing each of the plurality of application windows as corresponding buttons in a taskbar, wherein the desktop space is separate from and does not overlap the taskbar;
toggling off the window management mode;
receiving a second selection that identifies another one of the inactive applications, of the plurality of application windows in a scaled down form, to become an active application;
rendering the identified inactive application as a second active application window at or near full size in the desktop space such that it is displayed at a top of a Z-order that includes the first active application window, thereby adding the second active application window to a group of active applications;
toggling on the window management mode;
receiving a third selection that selects yet another one of the inactive applications, of the plurality of application windows in a scaled down form, to become an active application; and
rendering the selected another inactive application as a third active application window at or near full size in the desktop space such that it is displayed at a top of a Z-order that includes the first active application window, thereby adding the third active application window to the group of active applications and removing the second active application from the group of active applications for previously being at the top of the Z-order, wherein the first, the second, and the third selections are issued in a similar manner.

13. A method of claim 12, further comprising:
dynamically determining a number of all the inactive applications;
rendering all the inactive applications of the plurality of application windows in the scaled down form in the desktop space, wherein a degree of scaling of the scaled down form of each of the plurality of application windows is based on the number.

14. A method of claim 13, further comprising:
dynamically determining a size of the first active application window rendered at or near full size in the desktop space;
dynamically determining the desktop space available after rendering the first active application window at or near full size;
adjusting the scaled down form of each of the plurality of application windows is based on the number of all the inactive applications, the size of the first active application window, and the available desktop space.

15. A method of claim 14, wherein rendering all inactive applications of the plurality of application windows in a scaled down form in a desktop space comprises repositioning the plurality of application windows based upon current conditions, wherein the current conditions include one or more of the following: an orientation of the desktop space on the display screen; a total area of the desktop space; a position in the desktop space where the scaled-down plurality of application windows were expected to be rendered.

16. One or more computer-storage media having computer-executable instructions embodied thereon that, when executed, perform a method for concurrently displaying a plurality of application windows on a display screen, the method comprising:
  responsive to a first command, performing a process including:
    a) rendering plural application windows in a scaled down form in a desktop space, wherein the desktop space comprises an area of a display that allows for displaying windows corresponding to application programs;
    (b) representing the plural application windows as corresponding buttons in a taskbar, wherein the desktop space is separate from and does not overlap the taskbar;
    (c) rendering a first application window at or near full size in the desktop space;
  maintaining the underlying functionality of the plural application windows that are in the scaled down form by providing the plural application windows in a live state, wherein maintaining comprises:
    (a) providing for user interaction with the scaled down plural application windows, wherein no window interactions with the scaled down plural application windows or control interactions with application functionality underlying the scaled down plural application windows are affected by rendering the plural application windows in the scaled down form; and
    (b) automatically continually updating content within the scaled down plural application windows that is presented on the display screen; and
  responsive to a second command, rendering a second application window at or near full size in the desktop space, wherein none of the plural application windows overlap the first and second application windows.

17. The computer-storage media of claim 16, wherein the first command comprises invoking a window management mode, wherein the plural application windows rendered in the scaled down form in the desktop space are inactive application windows, and wherein the first application window rendered at or near full size in the desktop space is an active application window.

18. The computer-storage media of claim 17, wherein the second command comprises a fight click while hovering over one of the plural application windows in the scaled down form in the desktop space, wherein the window management mode is invoked.

19. The computer-storage media of claim 17, wherein the second command comprises a selection of one of the buttons in the taskbar corresponding to one of the plural application windows in the scaled down form in the desktop space, wherein the window management mode is toggled off.

20. The computer-storage media of claim 16, the method further comprising automatically continually updating web page content within the scaled-down plural application windows that is presented on the display screen.

* * * * *